Nov. 1, 1955 L. F. WEBSTER 2,722,061
CHILD'S GAME
Filed Aug. 4, 1952
FIG_1_
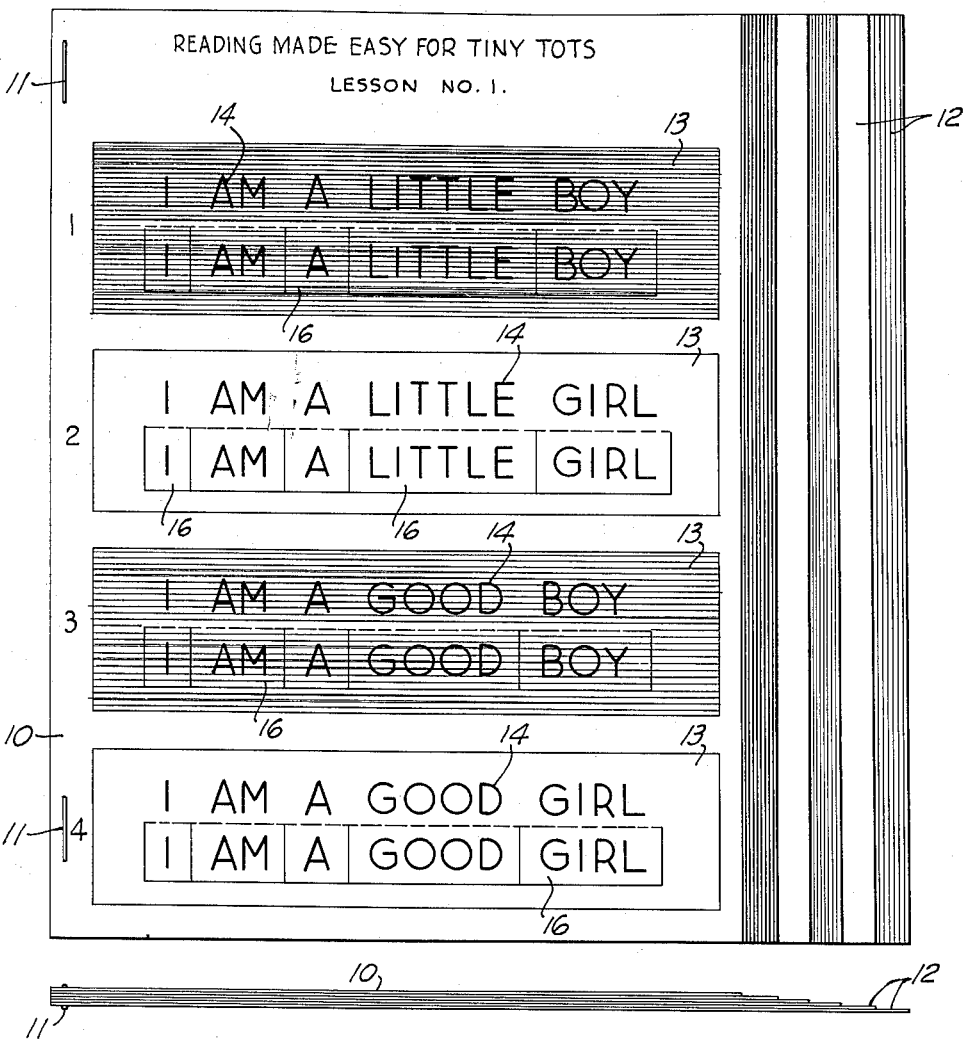
FIG_2_
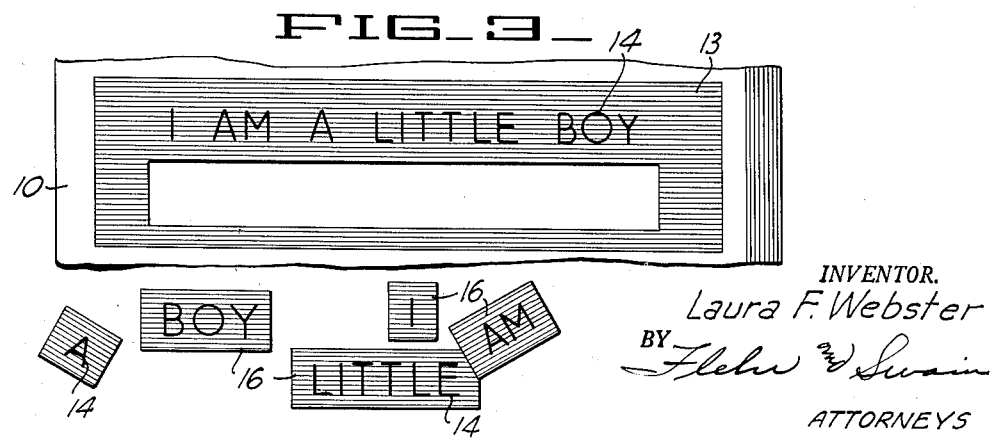
FIG_3_
INVENTOR.
Laura F. Webster
BY
ATTORNEYS

United States Patent Office 2,722,061
Patented Nov. 1, 1955

2,722,061

CHILD'S GAME

Laura F. Webster, San Francisco, Calif.

Application August 4, 1952, Serial No. 302,570

2 Claims. (Cl. 35—35)

This invention relates to children's games and particularly to children's games which are of an educational and instructional nature.

It is well known that when instruction is combined with play, instruction generally improves. It is an object of this invention to take advantage of this phenomenon and to provide a game whereby a child will learn to spell and to recognize words and colors while playing.

It is a further object of this invention to provide a device of this kind which is inexpensive to manufacture and which is simple to play whereby it may be available for the very young.

It is a still further object of this invention to provide games which require a minimum of adult supervision.

Other objects and advantages of this invention will appear from the following specification taken in conjunction with the accompanying drawing in which:

Figure 1 is a plan view of the preferred embodiment of my invention;

Figure 2 is a top view of the device illustrated in Figure 1; and

Figure 3 is a fragmentary view of my device during the period in which it is being played.

As indicated generally in Figure 1, my invention consists of a plurality of sheets of material 10 which are joined along their side edges in any suitable manner as, for example, by means of staples 11. Each of the sheets 10 is substantially identical with the exception, however, that the rear sheets are of greater width than the front sheets in order that they may be more easily selected by the provision of their extending edges 12.

The front surface of each of the sheets 10 is provided with a plurality of colored zones 13 which are preferably in the form of rectangles, as shown. The zones 13 may be of any particular color but I prefer that each zone be of a different color for reasons which will be made apparent further herein.

Each of the zones 13 also include thereon certain printed or other educational material 14. It will be noted that the expression 14 "I am a little boy" appears twice on one of the zones 13. The upper sentence or phrase 14, as the case may be, is printed permanently on the sheet 10 in contrast to the second or lower sentence which is printed on scored or cut portions 16. It will be noted that each of the scored or cut portions 16 contain merely one word. The word which each portion 16 contains is identical to the word immediately thereabove in the same zone. Thus, when a child removes one of the pieces 16 as indicated in Figure 3, he will be in a position to replace each particular portion 16 in its proper position with respect to the remainder of the game by virtue of the color of the piece 16 and the educational material appearing thereon. Let it be assumed, for example, that the child removes the piece which includes thereon the word "boy" and which is blue. The child, by color association, can replace a particular piece 16 in the blue zone. However, by associating the word (or other educational material) upon the piece 16 with a similar word on the fixed portion 10 he will properly position it with respect thereto. Thus if a child has learned that the permanently printed material in one of the zones includes the expression "I am a little boy" he will learn that the portions 16 which are adapted to be positioned thereunder also indicate "I am a little boy." By replacing particular separate portions 16 he will learn each of the words "I," "am," "a," "little," "boy."

It is to be understood, of course, that the educational material printed within the zones 13 and on the removable and replaceable portions 16, may be any educational material including numbers, simple problems and other words.

It will be noted that I have used the same word in various of the zones 13. The reason for so doing is that the child will learn to recognize the word under all conditions and will practice recognition of the word in combination with other words and other colors by playing the game.

I claim:

1. In a game for teaching sentence structure to children, a sheet of material, a plurality of different colored zones on said sheet, duplicate sentences printed in each of said zones adjacent each other, one of said sentences being cut into removable and replaceable portions, each portion having a single word thereon, the width of said portions being uniform but the length varying with the length of the word, the portions being replaceable by the child, replacement being facilitated by the child's association of the color and size of the removable portion with the length of the word to be duplicated and the color of the zone in which the portion is to lie.

2. In a game for teaching sentence structure to children, a sheet of material, a plurality of different colored zones on said sheet, duplicate sentences printed in each of said zones, the same words in each sentence lying adjacent each other, one of said sentences being cut into removable and replaceable portions, each portion having a single word thereon, with the width of said portion being uniform but the length varying with the length of the word, the portions being replaceable by the child, replacement being facilitated by the child's association of the size and color of the portion with the length of the word to be duplicated and the color of the zone in which the portion is to lie.

References Cited in the file of this patent

UNITED STATES PATENTS

| Number | Name | Date |
|---|---|---|
| 364,845 | Oakley | June 14, 1887 |
| 1,110,434 | Garman | Sept. 15, 1914 |
| 1,257,655 | Walden | Feb. 26, 1918 |
| 1,273,763 | Garman | July 23, 1918 |
| 1,394,620 | Haupt | Oct. 25, 1921 |
| 1,428,456 | Stranders | Sept. 5, 1922 |
| 1,755,853 | Waring | Apr. 22, 1930 |
| 1,826,034 | Williamson | Oct. 6, 1931 |
| 1,868,823 | Goodrich | July 26, 1932 |
| 2,193,048 | Vander Velde | Mar. 12, 1940 |
| 2,361,154 | Schoolfield | Oct. 24, 1944 |